(12) United States Patent
Li

(10) Patent No.: US 11,481,677 B2
(45) Date of Patent: Oct. 25, 2022

(54) MACHINE LEARNING BASED SIGNAL RECOVERY

(71) Applicant: SHEARWATER GEOSERVICES SOFTWARE INC., Houston, TX (US)

(72) Inventor: Chengbo Li, Houston, TX (US)

(73) Assignee: SHEARWATER GEOSERVICES SOFTWARE INC., Houston, TX (US)

( * ) Notice: Subject to any disclaimer, the term of this patent is extended or adjusted under 35 U.S.C. 154(b) by 478 days.

(21) Appl. No.: 16/583,528

(22) Filed: Sep. 26, 2019

(65) Prior Publication Data

US 2020/0104745 A1 Apr. 2, 2020

Related U.S. Application Data

(60) Provisional application No. 62/739,260, filed on Sep. 30, 2018.

(51) Int. Cl.
| | | |
|---|---|---|
| *G06N 20/00* | (2019.01) | |
| *H04Q 9/00* | (2006.01) | |
| *G01V 1/36* | (2006.01) | |

(52) U.S. Cl.
CPC ............ *G06N 20/00* (2019.01); *G01V 1/364* (2013.01); *H04Q 9/00* (2013.01);
(Continued)

(58) Field of Classification Search
CPC .. G06N 20/00; G01V 1/364; G01V 2210/324; G01V 2210/3246; G01V 2210/3248
See application file for complete search history.

(56) References Cited

U.S. PATENT DOCUMENTS

| | | |
|---|---|---|
| 2,906,363 A | 9/1959 | Clay, Jr. et al. |
| 3,747,055 A | 7/1973 | Greene, Jr. |

(Continued)

FOREIGN PATENT DOCUMENTS

| | | |
|---|---|---|
| CN | 103954993 A | 7/2014 |
| EP | 2103959 A2 | 9/2009 |

(Continued)

OTHER PUBLICATIONS

Ala'i R., "Shallow Water Multiple Prediction and Attenuation, case study on data from the Arabian Gulf," SEG International Exposition and 72nd Annual Meeting, Salt Lake City, Utah, Oct. 6-11, 2002, 4 pages.

(Continued)

*Primary Examiner* — Ojiako K Nwugo
(74) *Attorney, Agent, or Firm* — Polsinelli PC

(57) ABSTRACT

Various aspects described herein relate to a machine learning based signal recovery. In one example, a computer-implemented method of noise contaminated signal recovery includes receiving, at a server, a first signal including a first portion and a second portion, the first portion indicative of data collected by a plurality of sensors, the second portion representing noise; performing a first denoising process on the first signal to filter out the noise to yield a first denoised signal; applying a machine learning model to determine a residual signal indicative of a difference between the first signal and the first denoised signal; and determining a second signal by adding the residual signal to the first denoised signal, the second signal comprising (i) signals of the first portion with higher magnitudes than the noise in the second portion, and (ii) signals of the first portion having lower magnitudes than the noise in the second portion.

24 Claims, 7 Drawing Sheets

(52) U.S. Cl.
CPC .......... *G01V 2210/324* (2013.01); *G01V 2210/3246* (2013.01); *G01V 2210/3248* (2013.01)

(56) References Cited

U.S. PATENT DOCUMENTS

| | | | |
|---|---|---|---|
| 3,747,056 A | 7/1973 | Treybig et al. | |
| 3,840,845 A | 10/1974 | Brown | |
| 3,877,033 A | 4/1975 | Unz | |
| 4,330,873 A | 5/1982 | Peterson | |
| 4,404,684 A | 9/1983 | Takada | |
| 4,509,151 A | 4/1985 | Anderson | |
| 4,553,221 A | 11/1985 | Hyatt | |
| 4,559,605 A | 12/1985 | Norsworthy | |
| 4,596,005 A | 6/1986 | Frasier | |
| 4,597,066 A | 6/1986 | Frasier | |
| 4,721,180 A | 1/1988 | Haughland et al. | |
| 4,852,004 A | 7/1989 | Manin | |
| 4,958,331 A | 9/1990 | Wardle | |
| 4,967,400 A | 10/1990 | Woods | |
| 4,992,990 A | 2/1991 | Langeland et al. | |
| 5,079,703 A | 1/1992 | Mosher et al. | |
| 5,092,423 A | 3/1992 | Petermann | |
| 5,148,406 A | 9/1992 | Brink et al. | |
| 5,168,472 A | 12/1992 | Lockwood | |
| 5,353,223 A | 10/1994 | Norton et al. | |
| 5,469,404 A | 11/1995 | Barber et al. | |
| 5,487,052 A | 1/1996 | Cordsen | |
| 5,517,463 A | 5/1996 | Hornbostel et al. | |
| 5,724,306 A | 3/1998 | Barr | |
| 5,774,417 A | 6/1998 | Corrigan et al. | |
| 5,787,051 A | 7/1998 | Goodway et al. | |
| 5,835,450 A | 11/1998 | Russell | |
| 5,973,995 A | 10/1999 | Walker et al. | |
| 6,009,042 A | 12/1999 | Workman et al. | |
| 6,493,636 B1 | 12/2002 | DeKok | |
| 6,509,871 B2 | 1/2003 | Bevington | |
| 6,590,831 B1 | 7/2003 | Bennett et al. | |
| 6,691,038 B2 | 2/2004 | Zajac | |
| 6,876,599 B1 | 4/2005 | Combee | |
| 7,167,412 B2 | 1/2007 | Tenghamn | |
| 7,234,407 B1 | 6/2007 | Levine et al. | |
| 7,359,283 B2 | 4/2008 | Vaage et al. | |
| 7,408,836 B2 | 8/2008 | Muyzert et al. | |
| 7,451,717 B1 | 11/2008 | Levine et al. | |
| 7,499,374 B2 | 3/2009 | Ferber | |
| 7,499,737 B2 | 3/2009 | Mizuta et al. | |
| 7,515,505 B2 | 4/2009 | Krohn et al. | |
| 7,545,703 B2 | 6/2009 | Lunde et al. | |
| 7,646,671 B2 | 1/2010 | Pan et al. | |
| 7,993,164 B2 | 8/2011 | Chatterjee et al. | |
| 8,509,027 B2 | 8/2013 | Strobbia et al. | |
| 8,559,270 B2 | 10/2013 | Abma | |
| 8,619,497 B1 | 12/2013 | Sallas et al. | |
| 8,681,581 B2 | 3/2014 | Moldoveanu et al. | |
| 8,711,654 B2 | 4/2014 | Moldoveanu et al. | |
| 8,737,184 B2 | 5/2014 | Yamazaki | |
| 8,897,094 B2 | 11/2014 | Eick et al. | |
| 9,110,177 B1 | 8/2015 | Opfer | |
| 9,291,728 B2 | 3/2016 | Eick et al. | |
| 9,529,102 B2 | 12/2016 | Eick et al. | |
| 9,632,193 B2 | 4/2017 | Li et al. | |
| 9,690,003 B2 | 6/2017 | Sallas | |
| 9,823,372 B2 | 11/2017 | Eick et al. | |
| 9,846,248 B2 | 12/2017 | Eick et al. | |
| 10,267,939 B2 | 4/2019 | Eick et al. | |
| 10,267,940 B2* | 4/2019 | Nguyen | G01V 1/3808 |
| 10,514,474 B2 | 12/2019 | Eick et al. | |
| 10,605,941 B2 | 3/2020 | Li et al. | |
| 10,809,402 B2 | 10/2020 | Li et al. | |
| 10,823,867 B2 | 11/2020 | Eick et al. | |
| 10,989,826 B2 | 4/2021 | Eick et al. | |
| 11,035,968 B2 | 6/2021 | Li et al. | |
| 2004/0172199 A1 | 9/2004 | Chavarria et al. | |
| 2005/0088914 A1 | 4/2005 | Ren et al. | |
| 2006/0164916 A1 | 7/2006 | Krohn et al. | |
| 2006/0190181 A1* | 8/2006 | Deffenbaugh | G01V 1/28 702/14 |
| 2006/0268682 A1 | 11/2006 | Vasseur | |
| 2007/0013546 A1 | 1/2007 | McConnell et al. | |
| 2007/0025182 A1 | 2/2007 | Robertsson | |
| 2007/0027656 A1 | 2/2007 | Baraniuk et al. | |
| 2007/0027660 A1 | 2/2007 | Swift | |
| 2007/0276660 A1 | 11/2007 | Pinto | |
| 2008/0008037 A1 | 1/2008 | Welker | |
| 2008/0049551 A1 | 2/2008 | Muyzert et al. | |
| 2008/0080309 A1 | 4/2008 | Elkington et al. | |
| 2008/0089174 A1 | 4/2008 | Sollner et al. | |
| 2008/0144434 A1 | 6/2008 | Hegna et al. | |
| 2008/0151688 A1 | 6/2008 | Goujon | |
| 2008/0205193 A1 | 8/2008 | Krohn et al. | |
| 2008/0225642 A1 | 9/2008 | Moore et al. | |
| 2008/0240203 A1* | 10/2008 | Baqai | H04N 9/646 375/130 |
| 2008/0285380 A1 | 11/2008 | Rouquette | |
| 2009/0006053 A1 | 1/2009 | Carazzone et al. | |
| 2009/0010101 A1 | 1/2009 | Lunde et al. | |
| 2009/0067285 A1 | 3/2009 | Robertsson et al. | |
| 2009/0073805 A1 | 3/2009 | Tulett et al. | |
| 2009/0092006 A1 | 4/2009 | Teigen et al. | |
| 2009/0122641 A1 | 5/2009 | Hillesund et al. | |
| 2009/0141587 A1 | 6/2009 | Welker et al. | |
| 2009/0213693 A1 | 8/2009 | Du et al. | |
| 2009/0231956 A1 | 9/2009 | Schonewille | |
| 2009/0251992 A1 | 10/2009 | Van Borselen et al. | |
| 2009/0262601 A1 | 10/2009 | Hillesund et al. | |
| 2009/0279384 A1 | 11/2009 | Pavel | |
| 2009/0279386 A1 | 11/2009 | Monk | |
| 2009/0323472 A1 | 12/2009 | Howe | |
| 2010/0002536 A1 | 1/2010 | Brewer et al. | |
| 2010/0103772 A1 | 4/2010 | Eick et al. | |
| 2010/0128563 A1 | 5/2010 | Strobbia et al. | |
| 2010/0195434 A1 | 8/2010 | Menger et al. | |
| 2010/0208554 A1 | 8/2010 | Chiu et al. | |
| 2010/0211321 A1 | 8/2010 | Ozdemir et al. | |
| 2010/0265799 A1 | 10/2010 | Cevher et al. | |
| 2010/0299070 A1 | 11/2010 | Abma | |
| 2011/0019502 A1 | 1/2011 | Eick et al. | |
| 2011/0038227 A1 | 2/2011 | Kostov et al. | |
| 2011/0128818 A1 | 6/2011 | Eick et al. | |
| 2011/0156494 A1 | 6/2011 | Mashinsky | |
| 2011/0170796 A1 | 7/2011 | Qian | |
| 2011/0218737 A1 | 9/2011 | Gulati | |
| 2011/0286302 A1 | 11/2011 | Welker et al. | |
| 2011/0305106 A1 | 12/2011 | Eick et al. | |
| 2011/0305107 A1 | 12/2011 | Eick et al. | |
| 2011/0305113 A1 | 12/2011 | Eick et al. | |
| 2011/0307438 A1 | 12/2011 | Fernández Martínez | |
| 2011/0317517 A1 | 12/2011 | Borresen et al. | |
| 2012/0002503 A1 | 1/2012 | Janiszewski et al. | |
| 2012/0014212 A1 | 1/2012 | Eick et al. | |
| 2012/0051181 A1 | 3/2012 | Eick et al. | |
| 2012/0082004 A1 | 4/2012 | Boufounos | |
| 2012/0113745 A1 | 5/2012 | Eick et al. | |
| 2012/0143604 A1 | 6/2012 | Singh | |
| 2012/0281499 A1 | 11/2012 | Eick et al. | |
| 2012/0294116 A1 | 11/2012 | Kamata | |
| 2012/0300585 A1 | 11/2012 | Cao et al. | |
| 2013/0135966 A1 | 5/2013 | Rommel et al. | |
| 2013/0250720 A1 | 9/2013 | Monk et al. | |
| 2013/0294194 A1 | 11/2013 | Pritchard | |
| 2014/0133271 A1 | 5/2014 | Sallas | |
| 2014/0146638 A1 | 5/2014 | Renaud | |
| 2014/0211590 A1 | 7/2014 | Sallas | |
| 2014/0278289 A1 | 9/2014 | Etgen | |
| 2014/0303898 A1 | 10/2014 | Poole | |
| 2014/0334260 A1* | 11/2014 | Chang | G01V 1/305 367/27 |
| 2014/0362663 A1 | 12/2014 | Jones et al. | |
| 2015/0016218 A1 | 1/2015 | Welker et al. | |
| 2015/0078128 A1 | 3/2015 | Eick et al. | |
| 2015/0124560 A1 | 5/2015 | Li et al. | |
| 2015/0272506 A1 | 10/2015 | Childs et al. | |
| 2015/0348568 A1 | 12/2015 | Li et al. | |

(56) References Cited

U.S. PATENT DOCUMENTS

| | | | |
|---|---|---|---|
| 2016/0018547 | A1 | 1/2016 | Eick et al. |
| 2016/0341839 | A1 | 11/2016 | Kazinnik et al. |
| 2017/0031045 | A1 | 2/2017 | Poole et al. |
| 2017/0059732 | A1* | 3/2017 | Björnemo ............... G01V 1/38 |
| 2017/0068004 | A1* | 3/2017 | Takanashi ............. G01V 1/288 |
| 2017/0082761 | A1 | 3/2017 | Li et al. |
| 2017/0090053 | A1 | 3/2017 | Eick et al. |
| 2017/0090054 | A1* | 3/2017 | Willis ..................... G01V 1/42 |
| 2017/0108604 | A1* | 4/2017 | Turquais ................. G01V 1/38 |
| 2018/0003846 | A1* | 1/2018 | Wago ....................... G01V 1/50 |
| 2018/0067221 | A1 | 3/2018 | Eick et al. |
| 2018/0196155 | A1* | 7/2018 | Nguyen ................. G01V 1/282 |
| 2018/0259664 | A1* | 9/2018 | Li .......................... G01V 1/325 |
| 2018/0335536 | A1 | 11/2018 | Li et al. |
| 2019/0015052 | A1* | 1/2019 | Scalzo ............... G06K 9/00516 |
| 2019/0129050 | A1 | 5/2019 | Li et al. |
| 2019/0293813 | A1 | 9/2019 | Li et al. |
| 2019/0310387 | A1 | 10/2019 | Eick et al. |
| 2019/0385094 | A1* | 12/2019 | Alex ...................... G06F 11/076 |
| 2020/0225377 | A1 | 7/2020 | Li et al. |
| 2021/0033741 | A1 | 2/2021 | Li et al. |

FOREIGN PATENT DOCUMENTS

| | | | |
|---|---|---|---|
| EP | 2592439 | A2 | 5/2013 |
| WO | WO-2005019865 | A2 | 3/2005 |
| WO | WO-2008073178 | A2 | 6/2008 |
| WO | WO-2009092025 | A2 | 7/2009 |
| WO | WO-2010149589 | A2 | 12/2010 |
| WO | WO-2011156491 | A1 | 12/2011 |
| WO | WO-2011156494 | A2 | 12/2011 |
| WO | WO-2012166737 | A2 | 12/2012 |
| WO | WO-2013105075 | A1 | 7/2013 |
| WO | WO-2014057440 | A1 | 4/2014 |
| WO | WO-2014195508 | A2 | 12/2014 |
| WO | WO-2014195508 | A3 | 3/2015 |
| WO | WO-2015066481 | A1 | 5/2015 |
| WO | WO-2016009270 | A1 | 1/2016 |
| WO | WO-2018085567 | A1 | 5/2018 |

OTHER PUBLICATIONS

Almendros J., et al., "Mapping the Sources of the Seismic Wave Field at Kilauea Volcano, Hawaii, Using Data Recorded on Multiple Seismic Antennas," Bulletin of the Seismological Society of America, vol. 92(6), Aug. 2002, pp. 2333-2351.

Amir V., et al., "Structural Evolution Of The Northern Bonaparte Basin, Northwest Shelf Australia," Proceedings, Indonesian Petroleum Association, Thirty-Fourth Annual Convention & Exhibition, May 2010, 17 Pages.

Baraniuk R.G., "Compressive Sensing," IEEE Signal Processing Magazine, Jul. 2007, vol. 24(4), 9 pages.

Barzilai J., et al., "Two Point Step Size Gradient Methods," IMA Journal of Numerical Analysis, 1988, vol. 8, pp. 141-148.

Buia M., et al., "Shooting Seismic Surveys in Circles," Oilfield Review, 2008, pp. 18-31.

Candes E., et al., "Sparsity and Incoherence in Compressive Sampling," Applied and Computational Mathematics, Caltech, Pasadena, CA 91125 and Electrical and Computer Engineering, Georgia Tech, Atlanta, GA 90332, Nov. 2006, 20 pages.

Carlson D., et al., "Increased Resolution and Penetration from a Towed Dual-Sensor Streamer", First Break, Dec. 2007, vol. 25, pp. 71-77.

Cordsen A., et al., "Planning Land 3D Seismic Surveys," Geophysical Developments Series No. 9, Society of Exploration Geophysicists (SEG), Jan. 2000, 16 pages.

Dragoset B., et al., "A Perspective on 3D Surface-Related Multiple Elimination", Geophysics, Sep.-Oct. 2010, vol. 75, No. 5, pp. 75A245-75A261.

Foster D.J., et al., "Suppression of Multiple Reflections Using the Radon Transform", Mar. 1992, Geophysics, vol. 57, No. 3, pp. 386-395.

Hennenfent G., et al., "Application of Stable Signal Recovery to Seismic Data Interpolation," Gilles Hennenfent and Felix J. Herrmann Earth & Ocean Sciences Dept., University of British Columbia 2006, 4 pages.

Hennenfent G., et al., "Simply Denoise: Wavefield Reconstruction via Jittered undersampling," Geophysics, May-Jun. 2008, vol. 73(3), pp. V19-V28.

Herrmann F.J., "Randomized Sampling and Sparsity: Getting More Information from Fewer Samples," Geophysics, vol. 75(6), Nov.-Dec. 2010, pp. WB173-WB187.

Hindriks K., et al., "Reconstruction of 3D Seismic Signals Irregularly Sampled Along Two Spatial Coordinates," Geophysics, Jan.-Feb. 2000, vol. 65(1), pp. 253-263.

Huang H., et al., "Joint SRME and Model-Based Water-Layer Demultiple for Ocean Bottom Node", 2016 SEG International Exposition and Annual Meeting, Retrieved from Internet: URL: https://www.cgg.com/sites/default/files/2020-11/cggv_0000026243.pdf, pp. 4508-4512.

International Search Report and Written Opinion for Application No. PCT/US11/039640, dated Oct. 26, 2011, 8 Pages.

International Search Report for Application No. PCT/US2016/053750, dated Dec. 27, 2016, 2 Pages.

International Search Report for Application No. PCT/US2017/59760, dated Apr. 13, 2018, 2 pages.

Jin H., et al., "MWD for Shallow Water Demultiple: A Hibernia Case Study," Geo Convention 2012: Vision, 5 Pages.

Kumar R., et al., "Source Separation for Simultaneous Ttowed-Streamer Marine Acquisition—A Compressed Sensing Approach," Geophysics, vol. 80(6), Nov.-Dec. 2015, pp. WD73-WD88.

Li C., et al., "A Multi-Stage Inversion Method for Simultaneous Source Deblending of Field Data," SEG Annual Meeting 2014, Denver, Colorado, USA, Oct. 26, 2014, pp. 3610-3615.

Li C., et al., "Aspects of Implementing Marine Blended Source Acquisition in the Field," SEG International Exposition and 87th Annual Meeting, 2017, pp. 42-46.

Li C., et al., "Improving Streamer Data Sampling and Resolution via Non-Uniform Optimal Design and Reconstruction," SEG International Exposition and 87th Annual Meeting, 2017, pp. 4241-4245.

Li C., et al., "Interpolated Compressive Sensing for Seismic Data Reconstruction," SEG Las Vegas 2012 Annual Meeting, 2012, 6 pages.

Li C., et al., "Joint Source Deblending and Reconstruction for Seismic Data," SEG Houston 2013 Annual Meeting, 2013, pp. 82-87.

Li C., et al., "Marine Towed Streamer Data Reconstruction Based on Compressive Sensing," SEG Houston 2013 Annual Meeting, 2013, pp. 3597-3602.

Lin D., et al., "3D SRME Prediction and Subtraction Practice for Better Imaging", 2005, SEG Houston Annual Meeting, 5 pgs.

Liu B., et al., "Minimum Weighted Norm Interpolation of Seismic Records," Geophysics, Nov.-Dec. 2004, vol. 69(6), pp. 1560-1568.

Mahdad A., et al., "Separation of Blended Data by Iterative Estimation and Subtraction of Blending Interference Noise," Geophysics, vol. 76(3), May-Jun. 2011, pp. Q9-Q17.

Martin J., et al., "Acquisition of Marine Point Receiver Seismic Data With a Towed Streamer," SEG Technical Program Expanded Abstracts 2000, 4 pages.

Maurer H., et al., "Recent advances in optimized geophysical survey design," Seismic Data Acquisition, Geophysics, Sep.-Oct. 2010, vol. 75(5), SEG Press Book, pp. 75A177-75A194.

Memorandum Opinion and Order, *ConocoPhillips Company* v. *In-Depth Compressive Seismic, Inc., et al.*, Civil Action No. H-18-0803, entered Apr. 26, 2019, 49 pgs.

Milton A., et al., "Reducing Acquisition Costs with Random Sampling and Multidimensional Interpolation," SEG San Antonio 2011 Annual Meeting, 2011, pp. 52-56.

Moldoveanu N., "Random Sampling: A New Strategy for Marine Acquisition," SEG Expanded Abstracts, Denver, CO, 2010 Annual Meeting, 2010, pp. 51-55.

Mosher C., et al., "Increasing the Efficiency of Seismic Data Acquisition Via Compressive Sensing," Offshore Technology conference, Asia, Kuala Lumpur, Malaysia, Mar. 25-28, 2014, 4 pages.

(56) References Cited

OTHER PUBLICATIONS

Mosher C.C., et al., "An In-situ Analysis of 3-D Seismic Lateral Resolution," Borehole Geophysics, BHG 6.3, 1985, pp. 109-111.

Mosher C.C., et al., "Compressive Seismic Imaging: Moving from research to production," SEG International Exposition and 87th Annual Meeting, 2017, pp. 74-78.

Mosher C.C., et al., "Compressive Seismic Imaging," SEG Las Vegas 2012 Annual Meeting, 2012, DOI http://dx.doi.org/10.1190/segam2012-1460.1, 5 pages.

Mosher C.C., et al., "Non-Uniform Optimal Sampling for Seismic Survey Design," 74th EAGE Conference and Exhibition, Extended Abstracts, X034, Copenhagen, Denmark, Jun. 4-7, 2012, 5 pages.

Mosher C.C., et al., "Non-Uniform Optimal Sampling for Simultaneous Source Survey Design," SEG Annual Meeting, 2014, pp. 105-109.

Mosher C.C., "Generalized Windowed Transforms for Seismic Processing and Imaging," 2012 Annual SEG Meeting Las Vegas, Nevada, One Petro, SEG-2012-1196, Published by Society of Exploration Geophysicists, 4 pages.

Musser J.A., et al., "Streamer Positioning and Spread Stabilization for 4D Seismic," SEG 2006 Annual Meeting, New Orleans, 2006, 4 pages.

Sacchi M.D., "A Tour of High Resolution Transforms," Frontiers & Innovation, CSPG, CSEG, CWLS Convention, Calgary, Alberta, Canada, Expanded Abstracts, 2009, pp. 665-668.

Shapiro H.S., et al., "Alias-Free Sampling of Random Noise," SIAM Journal on Applied Mathematics, 1960, vol. 8(2), pp. 225-248.

Stolt R.H., "Seismic Data Mapping and Reconstruction," Geophysics, May-Jun. 2002, vol. 67(3), pp. 890-908.

Thomsen L., "Weak Elastic Anisotropy", Geophysics, Oct. 1986, vol. 51, No. 10, Society of Exploration Geophysicists, pp. 1954-1966.

Trad D., "Interpolation and Multiple Attenuation with Migration Operators," Geophysics, vol. 68(6), Nov.-Dec. 2003, pp. 2043-2054.

Wang L., et al., "Distributed Reconstruction via Alternating Direction Method," Hindawi Publishing Corporation, Computational and Mathematical Methods in Medicine, 2013, vol. 2013, Article ID 418747, pp. 1-7.

Wang P., et al., "Model-Based Water-Layer Demultiple", 2011, SEG San Antonio Annual Meeting, pp. 3551-3555.

Wang Y., et al., "Recovery of Seismic Wavefields based on Compressive Sensing by an l1-norm Constrained Trust Region Method and the Piecewise Random Subsampling," Geophysical Journal International, 2011(187), pp. 199-213.

Zhang H., et al., "A Nonmonotone Line Search Technique and its Application to Unconstrained Optimization," Society of Industrial and Applied Mathematics, 2004, vol. 14(4), pp. 1043-1056.

Zwartjes P.M., et al., "Fourier Reconstruction of Non-uniformly Sampled, Aliased Data," SEG Int'l Exposition and 74th Annual Meeting, Denver, Colorado, Oct. 10-15, 2004, 4 pages.

Zwartjes P.M., et al., "Fourier Reconstruction of Nonuniformly Sampled, Aliased Seismic Data," Geophysics, Jan.-Feb. 2007, vol. 72(1), pp. V21-V32.

International Preliminary Report on Patentability for for International application No. PCT/US2019/053174, dated Apr. 8, 2021, 7 pages.

International Search report and Written opinion for International application No. PCT/US2019/053174, dated Dec. 10, 2019, 8 pages.

Lotter T., et al., "Noise Reduction by Maximum a Posteriori Spectral Amplitude Estimation With Supergaussian Speech Modeling," International Workshop on Acoustic Echo and Noise Control (IWAENC2003), Kyoto, Japan, retrieved from URL: https://pdfs.semanticscholar.org/06e2/ad185cc5a809bb7493f8aea8afdad13105fb.pdf, on Nov. 16, 2019, Sep. 2003, pp. 83-86.

Extended European Search Report for Application No. 19866442.7 dated Aug. 18, 2022 (8 pages).

Lingchen Zhu et al., "Seismic data denoising through multiscale and sparsity-promoting dictionary learning", Geophysics, vol. 80, No. 6, Nov. 1, 2015 (Nov. 1, 2015), pp. WD45-WD57, XP057734071, US ISSN:0016-8033, DOI:10.1190/geo2015-0047.1.

\* cited by examiner

MACHINE LEARNING BASED SIGNAL RECOVERY

RELATED APPLICATION DATA

This application claims priority to U.S. Provisional Application No. 62/739,260 filed on Sep. 30, 2018, the entire content of which is incorporated herein by reference.

BACKGROUND

1. Field of the Invention

Aspects of the present inventive concept generally relate to recovery of relatively weak signals that are contaminated by noise and learn otherwise non recoverable using conventional processing methods.

2. Discussion of Related Art

Various types of data may be collected via use of one or a network of various types of sensors such as audio sensors, cameras, etc. Examples of such data can be seismic data collected in a field that can be analyzed to understand surface/subsurface seismic activity, surface temperature data, weather data, traffic data, etc. Such data may be contaminated by noise during the collection process. Currently, various conventional noise attenuation methods are utilized to recover signals representing the collected data. These conventional noise attenuation methods often use different characteristics in frequency, wave number or other transform domains to separate the signals representing the collected data from the noise. Examples of such noise attenuating methods include, but are not limited to, f-x projection filtering for random noise attenuation, a prediction error filtering to estimate coherent signal in the f-x domain, using low-rank structure in the t-f domain to attenuate ice-break noise, etc.

A shortcoming of all such noise attenuation methods is that they all involve a trade-off between preservation of the signals and the amount of filtered noise such that as noise attenuation increases, the target signals (e.g., seismic signals) are adversely affected. Moreover, some signals are several orders of magnitude lower than the contaminating noise. Therefore, these signals are lost/eliminated together with the noise during the filtering process, which adversely affect an accurate and complete analysis of the seismic data for underlying applications.

SUMMARY

The present inventive concept provides a system and method to extract signals that represent underlying collected data from contaminating noise signals, and to prevent the loss of portions of such signals that are several orders of magnitude smaller than the noise signals, which may be referred to as weak signals or relatively weak signals. The system and method of the present inventive concept are operable to apply machine learning to preserve weak signals during a de-noising process for extracting the signals.

In one aspect, a computer-implemented method of noise contaminated signal recovery includes receiving, at a server, a first signal including a first portion and a second portion, the first portion indicative of data collected by a plurality of sensors, the second portion representing noise; performing a first denoising process on the first signal to remove the noise to yield a first denoised signal; applying a machine learning model to determine a residual signal indicative of a difference between the first signal and the first denoised signal; and determining a second signal by adding the residual signal to the first denoised signal, the second signal comprising (i) signals of the first portion with higher magnitudes than the noise in the second portion, and (ii) signals of the first portion having lower magnitudes than the noise in the second portion.

In another aspect, the data corresponds to seismic data collected by the plurality of sensors.

In another aspect, determining the second signal is based on a single dictionary representing the noise trained using the machine learning model.

In another aspect, determining the second signal is based on a dual dictionary representing the noise and the data, the dual dictionary being trained using the machine learning model.

In another aspect, the method further includes training the machine learning model with the first denoised signal every time the server receives a different instance of the first signal and determines a corresponding first denoised signal.

In another aspect, training the machine learning model includes determining a solution to an optimization problem using a k-singular value decomposition algorithm.

In another aspect, training the machine learning model is unsupervised.

In another aspect, determining the residual signal includes determining a solution to a dual domain sparse inversion problem using a sparse representation of the residual signal and the noise.

In another aspect, solving the dual domain sparse inversion problem includes using a deterministic algorithm, the deterministic algorithm corresponding to one of a nonmonotone alternating direction method, or stochastic algorithm such as matching pursuit.

In one aspect, a system for noise contaminated signal recovery includes memory having computer-readable instruction stored therein, and one or more processors. The one or more processors are configured to execute the computer-readable instructions to receive a signal contaminated by noise, the signal including data collected by a plurality of sensors, the second portion representing noise; and process the signal using a machine learning model to yield a processed signal such that (1) the noise is removed from the processed signal and (2) portions of the data with magnitudes lower than magnitudes of the noise are preserved in the processed signal after removal of the noise.

In another aspect, the one or more processors are configured to execute the computer-readable instructions to process the signal by performing a denoising process on the signal to filter out the noise to yield a denoised signal; applying a machine learning model to determine a residual signal indicative of a difference between the signal and the denoised signal; and determining the processed signal by adding the recovered residual signal to the denoised signal.

In another aspect, the one or more processors are configured to control the plurality of sensors to determine the residual signal by determining a solution to a dual domain sparse inversion problem using a sparse representation of the residual signal and the noise.

In another aspect, solving the dual domain sparse inversion problem includes using a deterministic algorithm, the deterministic algorithm corresponding to one of a nonmonotone alternating direction method, or stochastic algorithm such as matching pursuit.

In another aspect, the one or more processors are configured to execute the computer-readable instructions to train the machine learning model with the denoised signal every time a different instance of the signal is received and a corresponding denoised signal is determined.

In another aspect, the one or more processors are configured to execute the computer-readable instructions to train the machine learning model by determining a solution to an optimization problem using a k-singular value decomposition algorithm.

In another aspect, the one or more processors are configured to control the plurality of sensors to collect the data over a specified period of time.

In one aspect, one or more non-transitory computer-readable medium have computer-readable instructions, which when executed by one or more processors of a system for noise contaminated signal recovery, cause the one or more processors to receive a signal contaminated by noise, the signal including data collected by a plurality of sensors, the second portion representing noise; and process the signal using a machine learning model to yield a processed signal such that (1) the noise is removed from the processed signal and (2) portions of the data with magnitudes lower than magnitudes of the noise are preserved in the processed signal after removal of the noise.

In another aspect, the execution of the computer-readable instructions by the one or more processors, cause the one or more processors to process the signal by performing a denoising process on the signal to filter out the noise to yield a denoised signal; applying a machine learning model to determine a residual signal indicative of a difference between the signal and the denoised signal; and determining the processed signal by adding the recovered residual signal to the denoised signal.

In another aspect, the execution of the computer-readable instructions by the one or more processors, cause the one or more processors to control the plurality of sensors to determine the residual signal by determining a solution to a dual domain sparse inversion problem using a sparse representation of the residual signal and the noise.

In another aspect, solving the dual domain sparse inversion problem includes using a deterministic algorithm, the deterministic algorithm corresponding to one of a nonmonotone alternating direction method, or stochastic algorithm such as matching pursuit.

In another aspect, the execution of the computer-readable instructions by the one or more processors, cause the one or more processors to form a dataset using the signal and perform the denoising process on the data set.

In another aspect, the execution of the computer-readable instructions by the one or more processors, cause the one or more processors to train the machine learning model with the denoised signal every time a different instance of the signal is received and a corresponding denoised signal is determined, by determining a solution to an optimization problem using a k-singular value decomposition algorithm.

In another aspect, the data corresponds to seismic data collected by the plurality of sensors over a specified period of time.

BRIEF DESCRIPTION OF THE DRAWINGS

In order to describe the manner in which the above-recited and other advantages and features of the present inventive concept can be obtained, a more particular description of the principles briefly described above will be rendered by reference to specific example embodiments thereof which are illustrated in the appended drawings. Understanding that these drawings depict only exemplary embodiments of the present inventive concept and are not therefore to be considered to be limiting of its scope, the principles herein are described and explained with additional specificity and detail through the use of the accompanying drawings in which.

DETAILED DESCRIPTION

Figure 1:
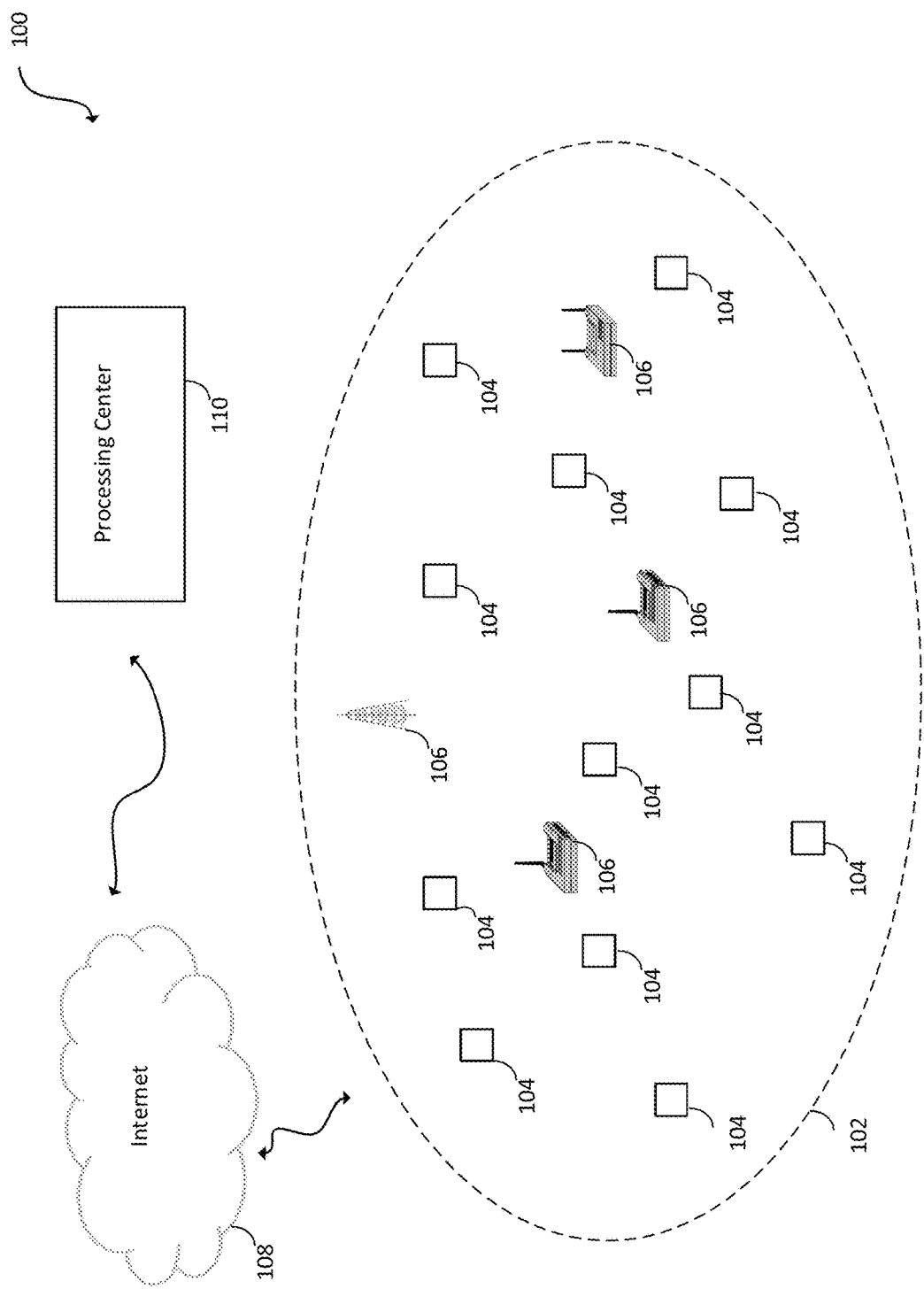
FIG. 1 illustrates an example environmental, according to an aspect of the present inventive concept.

Various example embodiments of the present inventive concept are discussed in detail herein. While specific implementations are discussed, it should be understood that this is done for illustration purposes only. A person skilled in the relevant art will recognize that other components and configurations may be used without parting from the spirit and scope of the present inventive concept. Thus, the following description and drawings are illustrative and are not to be construed as limiting. Numerous specific details are described to provide a thorough understanding of the present inventive concept. However, in certain instances, well-known or conventional details are not described in order to avoid obscuring the description. References to one or an example embodiment of the present inventive concept can be references to the same example embodiment or any example embodiment; and, such references mean at least one of the example embodiments.

Reference to "one embodiment" or "an embodiment" means that a particular feature, structure, or characteristic described in connection with the example embodiment is included in at least one example embodiment of the present inventive concept. The appearances of the phrase "in one embodiment" in various places in the specification are not necessarily all referring to the same example embodiment, nor are separate or alternative example embodiments mutually exclusive of other example embodiments. Moreover, various features are described which may be exhibited by some example embodiments and not by others.

The terms used in this specification generally have their ordinary meanings in the art, within the context of the present inventive concept, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the present inventive concept or of any example term. Likewise, the present inventive concept is not limited to various example embodiments given in this specification.

Without intent to limit the scope of the present inventive concept, examples of instruments, apparatus, methods and their related results according to the example embodiments of the present inventive concept are given below. Note that titles or subtitles may be used in the examples for convenience of a reader, which in no way should limit the scope of the present inventive concept. Unless otherwise defined, technical and scientific terms used herein have the meaning as commonly understood by one of ordinary skill in the art to which the present inventive concept pertains. In the case of conflict, the present document, including definitions will control.

Additional features and advantages of the present inventive concept will be set forth in the description which follows, and in part will be obvious from the description, or can be learned by practice of the herein disclosed principles. The features and advantages of the present inventive concept can be realized and obtained by means of the instruments and combinations particularly pointed out in the appended claims. These and other features of the present inventive concept will become more fully apparent from the following description and appended claims, or can be learned by the practice of the principles set forth herein.

Turning to FIG. 1, an example environmental according to an aspect of the present inventive concept is illustrated. Environment or setting 100 illustrates a field 102 throughout which various types of sensors 104 may be deployed to collect one or more types of data. For example, field 102 may be a large geographical area over land, sea, air, etc. The one or more types of data may include, but are not limited to, data on surface/subsurface seismic activity, surface/subsurface temperatures, movements of objects such as animals, radioactive substances, water flow, surface movement or displacement, etc.

Sensors 104 may be any type of known or to be developed device capable of collecting the underlying data including, but not limited to, conventional cameras, infrared cameras, audio/video sensors, etc. In one example, sensors 104 may be equipped with known or to be developed components for communicating with other sensors and/or other network components such as access points 106 and/or processing center 110 (which may also be referred to as receiver 110 or server 110). These components can be wireless connection interfaces, ports for wired connection to other devices, etc.

Setting 100 further includes one or more access points 106, which may include any type of known or to be developed access point such as a wireless access point, a base station, a 4G/5G node B, etc.

Sensors 104 and access points 106 may communicate via any known or to be developed wired and/or wireless communication schemes and protocols.

Access points 106 may be communicatively coupled to processing center 110 via internet 108. Processing center 110 may be a single unit or comprised of multiple units remotely placed from one another but communicatively coupled with one another. Processing center 110 may function to provide a network operator with the capability to access, monitor, manage and maintain access points 106 and/or sensors 104, as will be described below.

Figure 2:
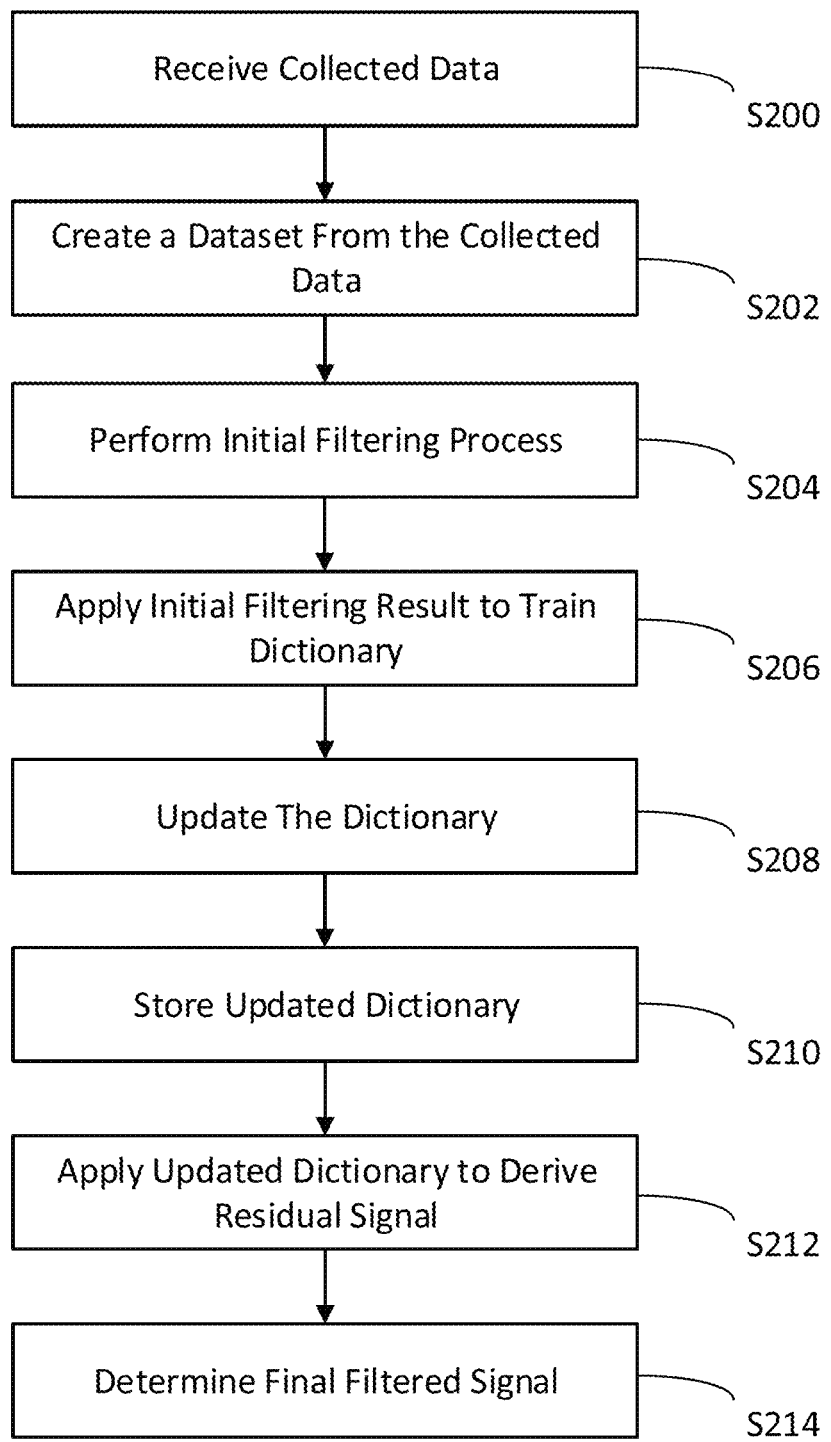
FIG. 2 illustrates an example process for machine learning based signal recovery, according to an aspect of the present inventive concept.

FIG. 2 illustrates an example process for machine learning based signal recovery, according to an aspect of the present inventive concept. FIG. 2 will be described from the perspective of processing center 110. However, it will be understood that processing center 110 has components such as a processor and a memory (which will be described with reference to FIG. 7), where such processor executes computer-readable instructions stored on such memory to carry the functionalities described below with reference to FIG. 2. Additionally, processing center 200 may be a single processor (CPU), a cluster of processors (CPUs), a cloud computing environment, etc.

At S200, processing center 110 may receive collected data from sensors 104 via one or more of access points 106, as described above with reference to FIG. 1.

In one example, processing center 110 may configure sensors 104 to collect such data continuously or for a specific period of time (e.g., for 24 hours, 48 hours, a week, a month, etc.). The collected data may be sent to processing center 110 by sensors 104 as a live stream as the data is being collected or may be sent all at once after collection (e.g., after the data is collected for the specified period of time). In another example, a command send by processing center 110 to sensors 104 may trigger transmission of the collected data from sensors 104 to processing center 110.

At S202, processing center 110 may group the collected data or portions thereof together to create a dataset to be analyzed. This grouping of the collected data or portions thereof may be based on timestamps associated with the received data. For example, when processing center 110 receives the collected data continuously, at S202, processing center 110 may select a portion of the data received over a specific period of time (last 24 hours, 48 hours, week, month, etc.) into a dataset to be analyzed.

In another example, sensors 104 may not be operating continuously. For example, processing center 110 may be able to turn them on and off. As such, processing center 110, prior to S200, may turn sensors 104 on, receive the collected data for a specific period of time, turn sensor 104 off and then at S202 group the received data into a dataset. This dataset may be represented by d. d may be composed of a signal portion (desired signal representing the collected data), represented by u, and a noise portion representing either coherent noise or incoherent noise depending on the noise type that contaminated the signal portion, represented by n. Accordingly, d may be given by formula (1) below:

$$d = u + n \tag{1}$$

At S204, processing center 110 may perform an initial filtering (denoising) process for filtering out (removing) the noise portion to the extent possible using any known or to be developed filtering/denoising process. The signal portion after the initial filtering process may be denoted as $\hat{u}$ (may be referred to as the initial filtering result).

S204 results in a "clean" mode for training, therefore, a certain degree of signal leakage is permissible. In one example, therefore, the initial filter process may apply a simple filtering method due to their efficiency such as an f-x deconvolution process or f-k filter with moveout correction to filter the noise portion or any other known or to be developed filtering methods or algorithms.

At S205, processing center 110, may rearrange (partition/divide) u into overlapping patches and vectorizes each path. By exploiting the redundancy of seismic data, $\hat{u}$ may be expressed by a multiplication of a dictionary D and sparse coefficient matrix x, per formula (2) shown below:

$$\hat{u} = Dx \tag{2}$$

As noted above, methods described herein to recover relatively weak signals is based on applying machine learning. According to an example of such machine learning process, which may also be referred to as an unsupervised machine learning, a dictionary D may be trained using û. Accordingly, at S206, processing center 110 applies the initial filtering result (û) to train dictionary D. In one example, training dictionary D is based on formula (2) below:

$$\min_{D,x} \|\hat{u}-Dx\|_F^2 \, s.t. \, \|x\|_0 \leq T. \tag{3}$$

In formula (3), T is a sparse threshold, T represents the sparsity threshold, $\|\cdot\|_F$ denotes the Frobenius norm, and $\|\cdot\|_0$, referred to as the $l_0$ norm counts the number of nonzero entries. Formula (3) is an example of an optimization problem can be solved using a K-Singular Value Decomposition (K-SVD) algorithm. Adopting the idea of block coordinate descent, the K-SVD algorithm can reduce the $l_0$ minimization problem into two subproblems—sparse coding and dictionary updating. The sparse coding aspect includes calculating the sparse coefficients through orthogonal matching pursuit (OMP) or a variant of OMP for a given dictionary D, while the dictionary updating step updates atoms by solving a series of rank-1 approximations to decrease the data misfit. Dictionary updating involves performing singular value decomposition repeatedly. To reduce the complexity of dictionary learning, exact singular value decomposition may be replaced with randomized singular value decomposition, or the solution thereof approximated by taking a single iteration of gradient descent.

At S208, processing center 110 updates dictionary D with the solution to the optimization problem given by formula (3). Accordingly, as more and more data is collected, dictionary D is trained, which will then be used to extract relatively weak signals that may otherwise be filtered with noise using conventional noise filtering/attenuation processes. The accuracy of the residual signal recovery using dictionary D increases as more and more data is used to train dictionary D.

At S210, processing center 110 stores the updated dictionary D in a memory or an associated database of processing center 110.

At S212, processing center 110 applies the stored dictionary D to derive a residual signal, which is a difference between d and û, given by formula (4) below:

$$\hat{d} = d - \hat{u} \tag{4}$$

which denotes the residual signal with noise. For random Gaussian noise, we can employ a standard sparse inversion procedure for recovery. The sparse representation of the residual signal, $x_1$, can be obtained by solving:

$$\min_{x_1} \|x_1\|_1 \, s.t. \, \|\hat{d}-Dx_1\|_F^2 \leq \epsilon, \tag{5}$$

where $\epsilon$ is the error threshold dictated by the noise variance, and $\|\cdot\|_1$ denotes the $l_1$ norm used to impose sparsity with robustness. However, the assumption of Gaussian noise is rarely held for field data and, therefore, solving the standard sparse inversion problem may provide suboptimal results.

This residual signal, is a signal that contains the relatively weak signals (e.g., weak seismic signal relative to the magnitude of the contaminating noise signal) and therefore by applying dictionary D thereto, the relatively weak signals can be recovered and added to û to obtain a final denoised signal. This final denoised signal has more signals, including the relatively weak signals, retained therein, when compared to the final denoised signals obtained by apply conventional filtering methods to d, as previously discussed.

In one example and in applying dictionary D, an assumption is made that the initial filtering result (i.e., û) and the residual signal (i.e., d̂) share the same set of basis functions.

In one example, to better separate the residual signal from the noise, processing center 110 may invert both (the residual signal and the noise) simultaneously using a dual-domain sparse inversion processing given by formula (6) below:

$$\min_{x_1,x_2} \|x_1\|_0 + \alpha \|x_2\|_0 \, s.t. \, \|\hat{d}-Dx_1-Sx_2\|_F^2 \leq \epsilon \tag{6}$$

In formula (6), $x_1$ and $x_2$ are sparse representations of the residual signal and the noise signal (i.e., e), S is the chosen sparsity basis for the noise, $\epsilon$ is a configuration error tolerance, which may be determined according to experiments and/or empirical studies indicative of the collected data (e.g., seismic data) and $\|x_1\|_0/\|x_2\|_0$ may be referred to as the $l_0$-norm. In one example, sparsity of the noise and residual signals may be imposed using $l_1$-norm instead of $l_0$-norm.

With $x_1$ derived per formula (6), at S212, processing center 110 applies D to $x_1$ to derive (determine) the residual signal (e.g., $Dx_1$). Thereafter, at S214, processing center 110 may determine a final filtered signal, which can be obtained by addition of $Dx_1$ to û. This final filtered signal may be referred to as $u_{out}$ given by formula (7) below:

$$u_{out} = \hat{u} + Dx_1 \tag{7}$$

The final filtered (denoised) signal derived per process of FIG. 2 may be used for further analysis of the underlying data for the intended application (e.g., studying and understanding surface/subsurface seismic activity, temperatures, weather pattern, etc.). This further processing may be performed by processing center 110 or may be output by processing center 110 to another processing component for completing the further analysis.

The above process described with reference to FIG. 2 may be referred to as signal recovery with single dictionary learning method. In another example, a similar process but instead of one dictionary, there can be a dual dictionary learning for signal recovery, where both noise and underlying signal components are learned.

The proposed method of FIG. 2 with single dictionary learning demands a predefined S to characterize noise. It works well for incoherent noise or well-behaved coherent noise, with energy focused in a transform domain. However, the method with single dictionary training may not be optimal or effectively represent the noise that is highly dispersive or scattered. A natural extension of the method is to build S by learning in a similar way and utilizes both adaptive dictionaries for inverting residual signal.

For this dual dictionary training based method, assume that a noise estimate can be attained by applying the conventional method, denoted by g; i.e., $$\hat{n} = g(d). \tag{8}$$

Next, the noise model $\hat{n}$ may be partitioned/rearranged in a same way as the signal model û described above with reference to S205 of FIG. 2. The formed noise matrix is then input to train the dictionary S by solving a similar dictionary learning problem as in Formula (3) using the K-SVD. In the recovery step, the predefined transform is replaced by the trained dictionary S adapted from the noise estimate. A similar dual-domain sparse inversion as in formula (6) can be employed to invert the residual signal from the noisy data a.

The dual dictionary learning may require additional estimate of the noise model and one more training step prior to recovery, which unavoidably increases the computation cost. However, the method provides an effective alternative for attenuating some of the most complex noise.

The proposed method with single or dual dictionary learning differs from many residual signal recovery methods since it requires no assumptions on local similarities between the initial estimate and the residual signal. A common set of bases functions in a global context suffices to assure the recovery.

One advantage of determining the final filtered signal per process of FIG. 2 is that the process, unlike conventional filtering methods, does not need any assumption on neither local similarities nor signal coherency in any transfer domain between the initial estimate and the residual signal. In other words, a common set of base functions in a global context suffices to assure the success of signal recovery, where relatively weak signals are preserved and as such, a more accurate and complete analysis of the received data can be performed.

Figure 3:
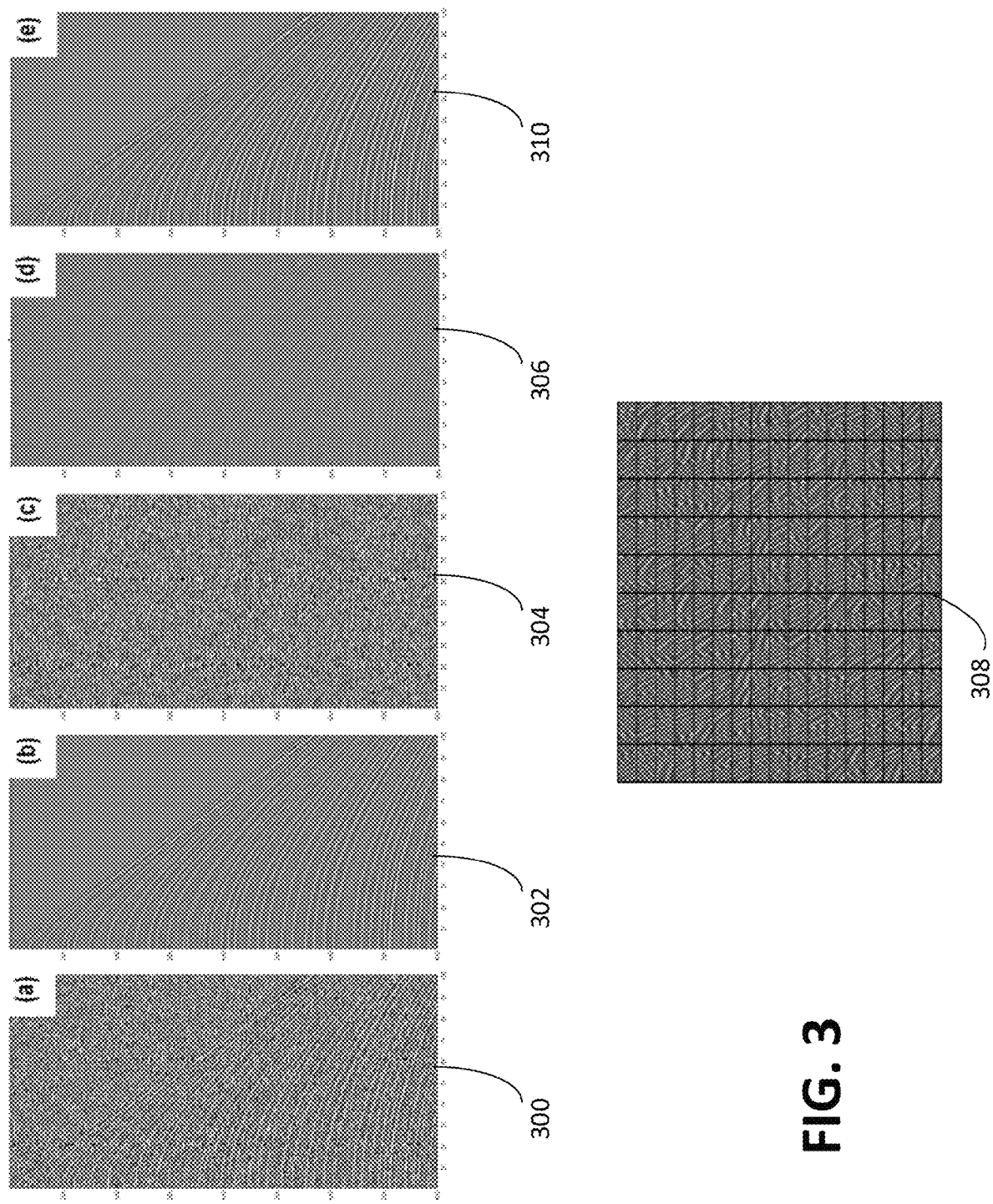
FIG. 3 illustrates example outputs of the process of FIG. 2, according to an aspect of the present inventive concept.

FIG. 3 illustrates example outputs of the process of FIG. 2, according to an aspect of the present inventive concept. Graph 300 is an example of a noisy input received at S200 at processing center 110. Graph 302 is an example of the results of the initial filtering performed by processing center 110 on the received noisy input at S204. Graph 304 is an example of a difference between the noisy input of graph 300 and the initial filtering result of graph 302 (e.g., $\tilde{d}$ per formula (4) described above with reference to FIG. 2). Graph 306 is an example of applying dictionary D to the residual signal (e.g., $Dx_1$). Graph 308 is an example of a subset of dictionary D with each patch (grid) in graph 308 representing an atom in the dictionary D. Finally, graph 310 is an example of $u_{out}$ determined at S214, as described above.

Figure 4:
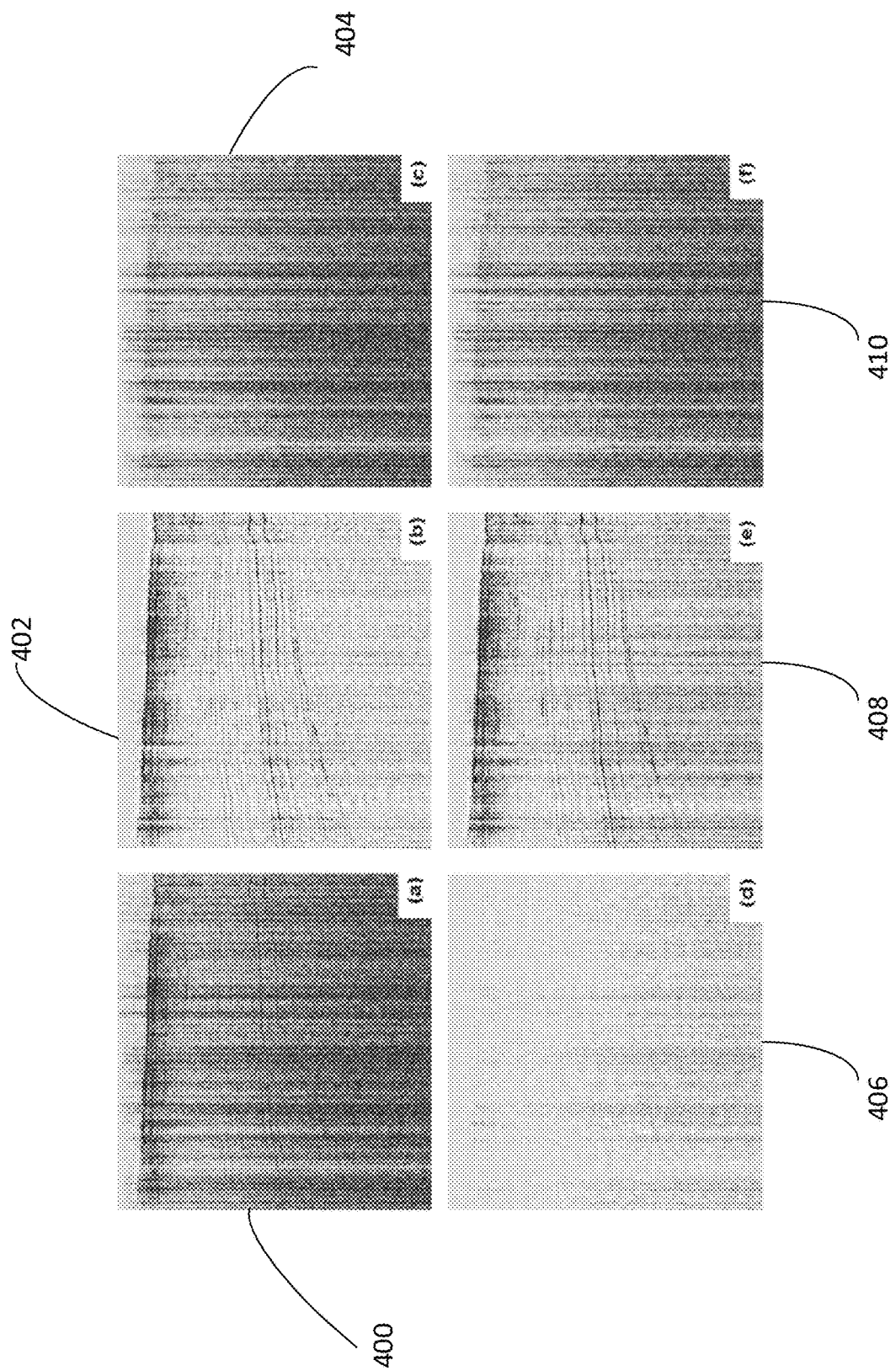
FIG. 4 illustrates example outputs of the process of FIG. 2, according to an aspect of the present inventive concept.

FIG. 4 illustrates example outputs of the process of FIG. 2, according to an aspect of the present inventive concept. While FIG. 3 illustrates results of applying the process of FIG. 2 to synthetic/computer generated data, FIG. 4 illustrates the result of applying the process of FIG. 2 to real world data collected on the Alaskan North Slope using sensors 104 (e.g., point sources, point receivers as well as Compressive Sensing Imaging (CSI) technology). The collected data of FIG. 4 is contaminated by strong noise due to extreme weather conditions within the region in which the data is collected.

The collected data is first sorted into offset-vector tiles (OVTs) shown in graph 400. According to process of FIG. 2 (i.e., S204) initial filtering process is performed using Singular Spectrum Analysis (SSA) to reduce noise and generate initial signal estimate in the OVT domain. Graph 402 illustrates the collected data after the initial filter process of S204 using SSA while graph 404 illustrate the difference between graphs 400 and 402 (in other words, graph 404 illustrates the removed noise).

Results of graph 402 is then fed into the above described dictionary to derive the residual signal shown in graph 406 (S206 to S212 of FIG. 2 and using dual sparse inversion as described above). The process of S214 is then applied to residual signals shown in graph 406 to provide the final filtered signal shown in graph 408.

Graph 410 illustrates the difference between the final denoised result of graph 408 and the initial collected data shown in graph 400.

Comparing graphs 404 and 406, it can be observed that relatively weak signals indicative of seismic activity are extracted with only a fraction of noise remaining.

Figure 5:
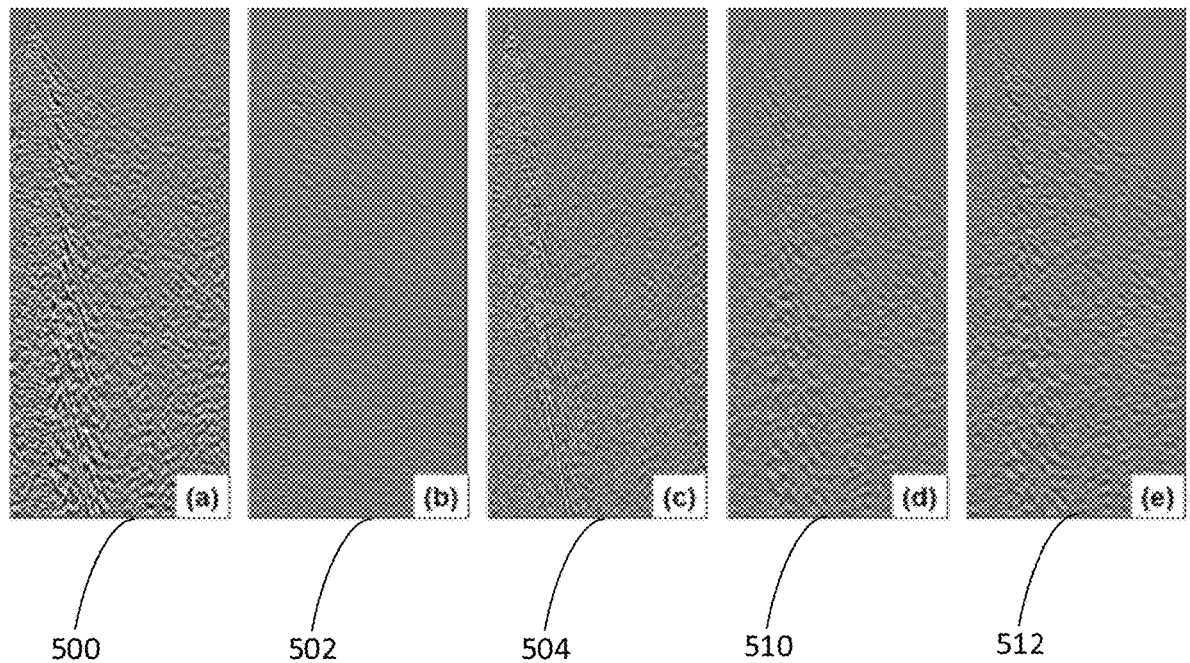
FIG. 5 illustrates example outputs of the process of FIG. 2, according to an aspect of the present inventive concept.
Figure 5:
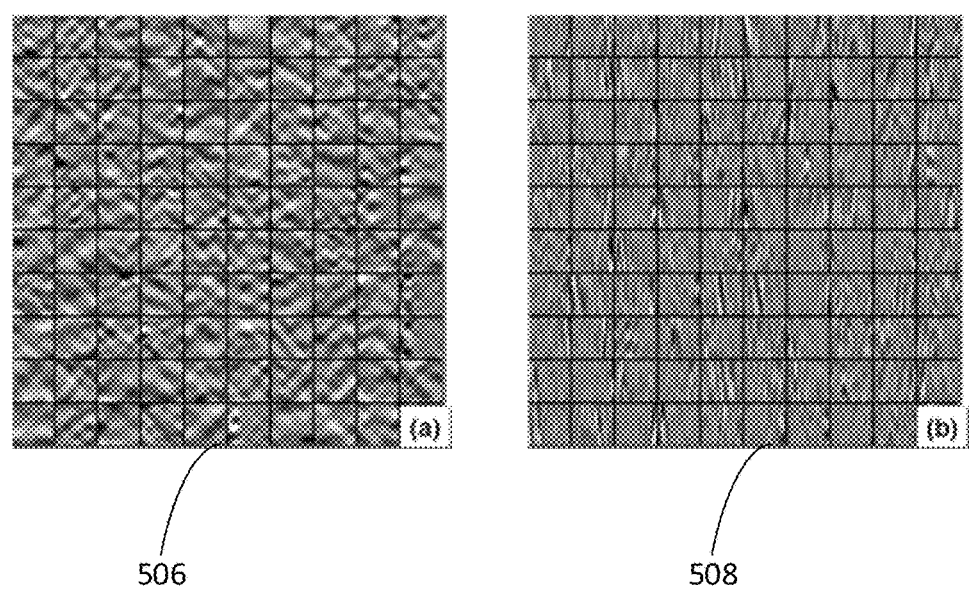

FIG. 5 example outputs of the process of FIG. 2, according to an aspect of the present inventive concept. FIG. 5 illustrates an example of coherent noise attenuation via dual dictionary learning as described above. High-density dataset over a producing field in Permian Basin using CSI technology was taken. By applying the dual dictionary learning, objective is to improve image quality for unconventional reservoir development. The field from which data is taken is known to be a difficult seismic data area—salt dissolution in the near surface leads to a strong back-scattering. Graph 500 exhibits a typical raw data, in which the scattered noise together with ground roll created a complex noise pattern. In the near and mid offsets, the scattered energy is more than 30 dB higher than the reflected energy For initial noise attenuation, envelop soft mute followed by windowed Fourier domain filtering (WFT) is employed to preserve flat or near-flat events after static and moveout corrections. Graph 502 shows the initial denoised result which was served as the signal estimate for training. To generate the initial noise estimate, envelop soft mute was applied again on the differences to extract the high-amplitude portion of the scattered and ground roll noise, as shown in graph 504. Both models are next input for dictionary learning to adaptively form D and S, described above. Graphs 506 and 508 displays the subsets of learned dictionaries—atoms with distinct characters were trained which enables further separation of signal and noise. Graph 510 shows the recovered residual signal by incorporating dual dictionaries in inversion, and graph 512 shows the final denoised result with signal recovery.

Figure 6:
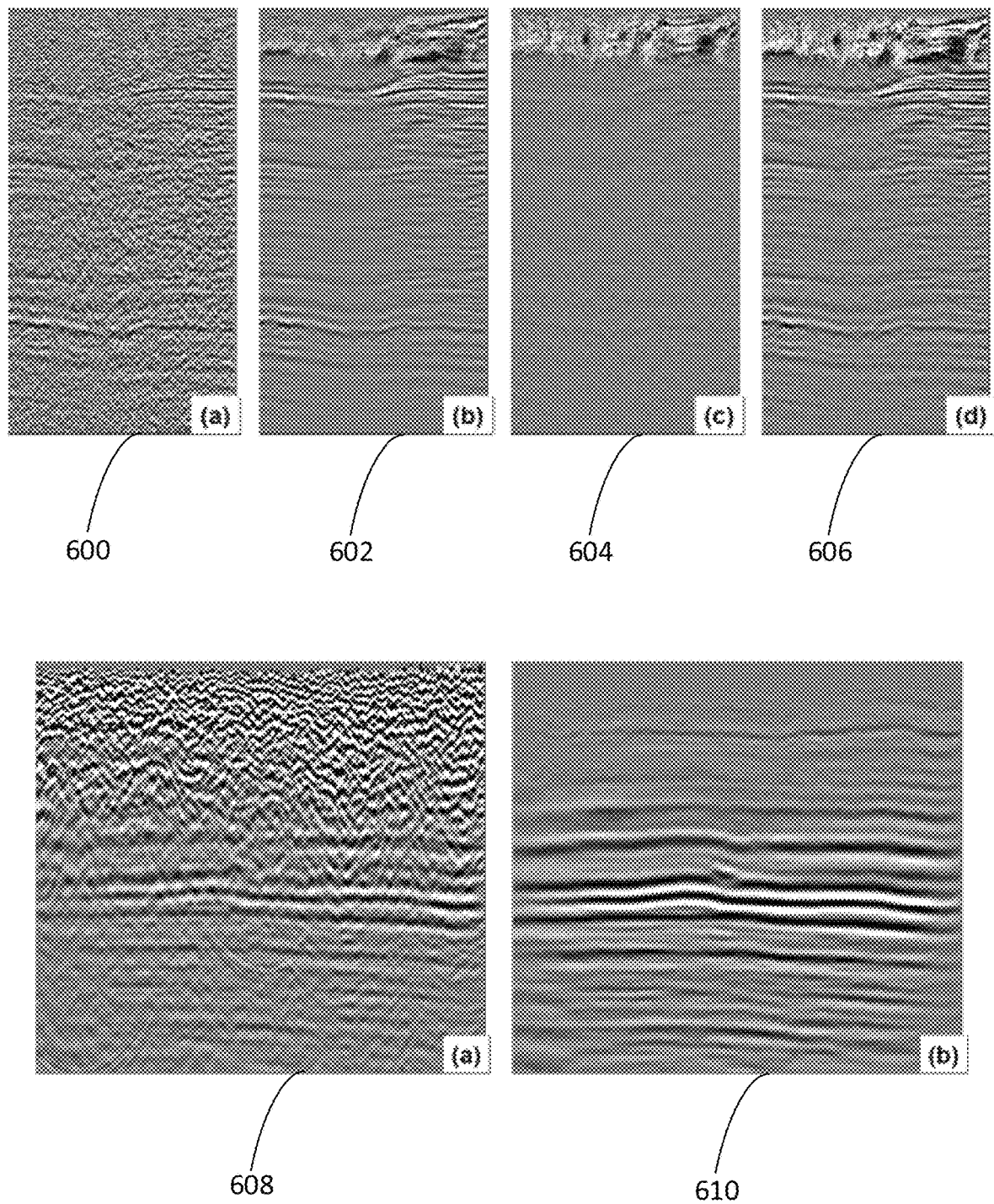
FIG. 6 illustrates example outputs of the process of FIG. 2, according to an aspect of the present inventive concept.

We next stacked the data for further quality control (QC), the result of which is shown in FIG. 6. FIG. 6 example outputs of the process of FIG. 2, according to an aspect of the present inventive concept. Despite the high fold of over 10,000, the raw stack still exhibits strong distortions from near-surface scattering, as shown in Graph 600. Graphs 602, 604 and 606 plot the stacks of initial denoised data using WFT, recovered residual signal and final denoised data, respectively. Comparing Graphs 602 and 604, we can observe the primary energy has been successfully recovered for both shallow and deep reflectors. The final denoised stack in Graph 606 indicates a good denoising quality with minimal distortions and primary leakage. Following a velocity model building exercise on denoised data, pre-stack depth migration was performed for imaging evaluation. Graphs 608 and 610 illustrate a comparison of a shallow migrated image (0-8,000 ft) between raw and final denoised data. The significant uplifts above 3,500 ft make the very shallow image interpretable and allow better planning for hazard avoidance. The Delaware horizon (bright reflector around 4,500 ft) and below is also evidently better imaged, with reduced migration artifacts and clearly defined faults. The positive result from such a difficult data area suggests a good performance of the proposed learning-based method in attenuating coherent noise.

Signal recovery using single and dual dictionary learning are described above. However, the present disclosure is not limited thereto. Any number of N dictionaries may be used where N is a positive integer greater than 2 conditions on input signal being partitioned into N distinct signals/noises, where sparse invention can be applied to such N dictionaries to recover underlying data signal.

Examples described above provide an unsupervised machine learning and sparse inversion based method for recovery of weak signals indicative of seismic activity (weak relative to existing noise signals) that would otherwise be lost during noise filtering/attenuation process utilized by current signal recovery methods. These examples are equally applicable to both coherent and incoherent noise on pre-stack and/or stacked images.

Figure 7:
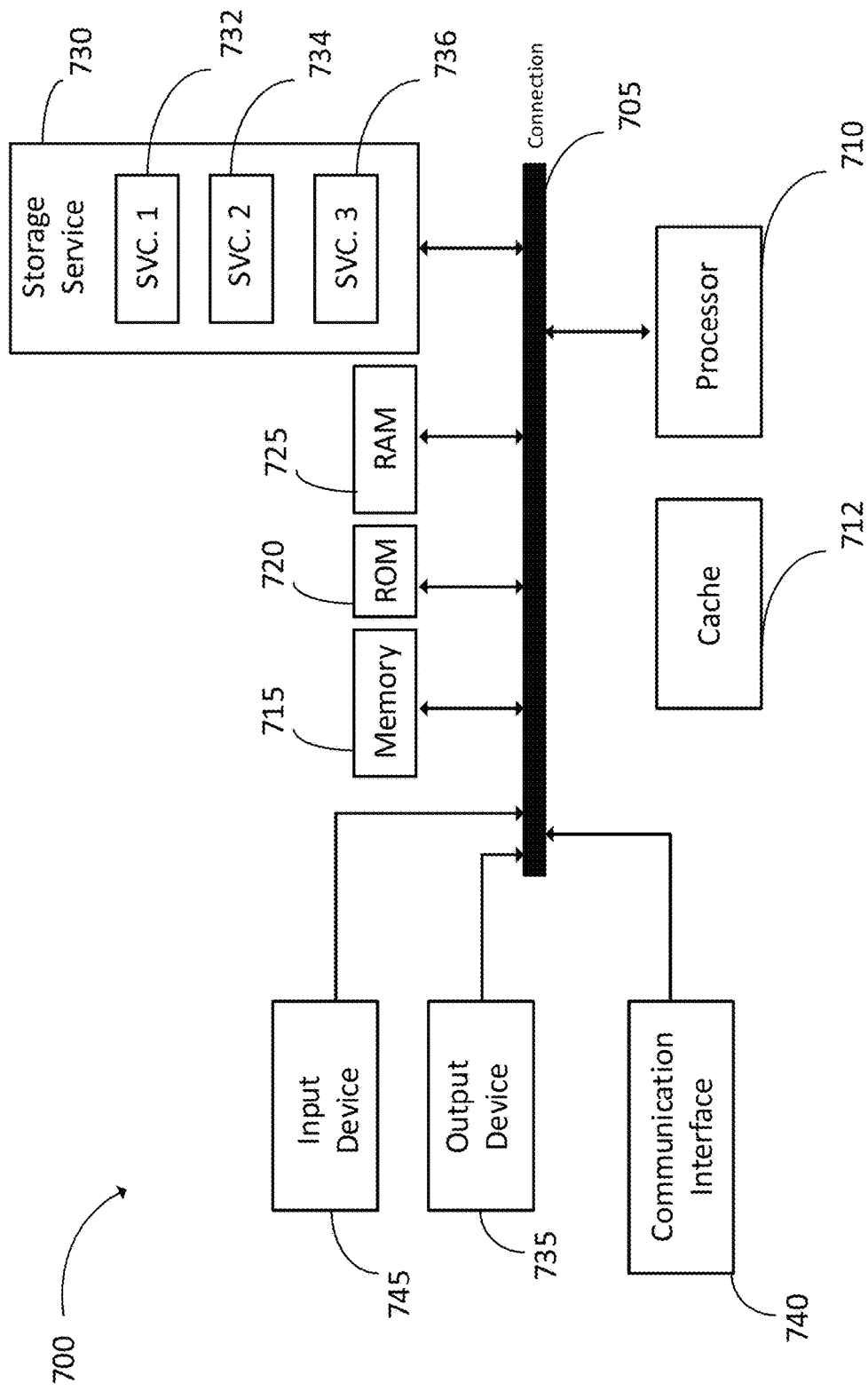
FIG. 7 illustrates an example computing device, according to an aspect of the present inventive concept.

Having described examples of machine learning based signal recovery with application to signals indicative of seismic activity and turning to FIG. 7, an example computing system 700 is illustrated, which can be implemented as processing center 110 or a server of processing center 110 for implementing functionalities described with reference to FIG. 2. System 700 can include components in electrical communication with each other using a connection 705, such as a bus. System 700 includes a processing unit (CPU or processor) 710 and connection 705 that couples various system components including the system memory 715, read only memory (ROM) 720 and/or random access memory (RAM) 725, to the processor 710. System 700 can include a cache 712 of high-speed memory connected directly with, in close proximity to, or integrated as part of processor 710. System 700 can copy data from memory 715 and/or storage device 730 to cache 712 for quick access by processor 710. In this way, cache 712 can provide a performance boost that avoids processor 710 delays while waiting for data. These and other modules can control or be configured to control processor 710 to perform various actions. Other system memory 715 may be available for use as well. Memory 715 can include multiple different types of memory with different performance characteristics. Processor 710 can include any general purpose processor and a hardware or software service, such as service 1 732, service 2 734, and service 3 736 stored in storage device 730, configured to control processor 710 as well as a special-purpose processor where software instructions are incorporated into the actual processor design. Processor 710 may be a completely self-contained computing system, containing multiple cores or processors, a bus, memory controller, cache, etc. A multi-core processor may be symmetric or asymmetric.

To enable user interaction with system 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with system 700. Communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

Storage device 730 can include service 1 732, service 2 734 and/or service 3 736 for execution by processor 710 to cause processor 710 to carryout functionalities described above with reference to FIG. 2. Other hardware or software modules are contemplated. Storage device 730 can be connected to connection 705. In one aspect, a hardware module that performs a particular function can include the software component stored in a computer-readable medium in connection with the necessary hardware components, such as processor 710, connection 705, output device 735, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to the present inventive concept can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described herein with respect to the present inventive concept.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items in the claims and/or specification refers to any combination of those items, including single members or multiple members. As an example, "at least one of a, b, and c" is intended to cover a; b; c; a and b; a and c; b and c; or a, b and c.

What is claimed is:

1. A computer-implemented method of noise contaminated signal recovery, the method comprising:
    receiving, at a server, a first signal including a first portion and a second portion, the first portion indicative of data collected by a plurality of sensors, the second portion representing noise;
    performing a first denoising process on the first signal to remove the noise to yield a first denoised signal;
    applying a machine learning model to determine a residual signal indicative of a difference between the first signal and the first denoised signal; and
    determining a second signal by adding the residual signal to the first denoised signal, the second signal comprising (i) signals of the first portion with higher magnitudes than the noise in the second portion, and (ii) signals of the first portion having lower magnitudes than the noise in the second portion.

2. The computer-implemented method of claim 1, wherein the data corresponds to seismic data collected by the plurality of sensors.

3. The computer-implemented method of claim 1, further comprising:
    training the machine learning model with the first denoised signal every time the server receives a different instance of the first signal and determines a corresponding first denoised signal.

4. The computer-implemented method of claim 3, wherein training the machine learning model includes determining a solution to an optimization problem using a k-singular value decomposition algorithm.

5. The computer-implemented method of claim 3, wherein the training the machine learning model is unsupervised.

6. The computer-implemented method of claim 1, wherein determining the residual signal includes determining a solution to a dual domain sparse inversion problem using a sparse representation of the residual signal and the noise.

7. The computer-implemented method of claim 6, wherein solving the dual domain sparse inversion problem includes using a deterministic algorithm, the deterministic algorithm corresponding to one of a nonmonotone alternating direction method, or stochastic algorithm such as matching pursuit.

8. The method of claim 1, wherein determining the second signal is based on a single dictionary representing the noise trained using the machine learning model.

9. The method of claim 1, wherein determining the second signal is based on a dual dictionary representing the noise and the data, the dual dictionary being trained using the machine learning model.

10. A system for noise contaminated signal recovery, the system comprising:
    memory having computer-readable instruction stored therein; and
    one or more processors configured to execute the computer-readable instructions to:
        receive a signal contaminated by noise, the signal including data collected by a plurality of sensors; and
        process the signal using a machine learning model to yield a processed signal such that (1) the noise is removed from the processed signal and (2) portions of the data with magnitudes lower than magnitudes of the noise are preserved in the processed signal after removal of the noise.

11. The system of claim 10, wherein the one or more processors are configured to execute the computer-readable instructions to process the signal by:
    performing a denoising process on the signal to remove the noise to yield a denoised signal; applying the machine learning model to determine a residual signal indicative of a difference between the signal and the denoised signal; and determining a processed signal by adding the residual signal to the denoised signal.

12. The system of claim 11, wherein the one or more processors are configured to control the plurality of sensors to determine the residual signal by determining a solution to a dual domain sparse inversion problem using a sparse representation of the residual signal and the noise.

13. The system of claim 11, wherein the one or more processors are configured to execute the computer-readable instructions to:
    train the machine learning model with the denoised signal every time a different instance of the signal is received and a corresponding denoised signal is determined.

14. The system of claim 13, wherein the one or more processors are configured to execute the computer-readable instructions to train the machine learning model by determining a solution to an optimization problem using a k-singular value decomposition algorithm.

15. The system of claim 13, wherein training the machine learning model is unsupervised.

16. The system of claim 10, wherein the data corresponds to seismic data collected by the plurality of sensors.

17. The system of claim 16, wherein the one or more processors are configured to control the plurality of sensors to collect the data over a specified period of time.

18. One or more non-transitory computer-readable medium having computer-readable instructions, which when executed by one or more processors of a system for noise contaminated signal recovery, cause the one or more processors to:
    receive a signal contaminated by noise, the signal including data collected by a plurality of sensors; and
    process the signal using a machine learning model to yield a processed signal such that (1) the noise is removed from the processed signal and (2) portions of the data with magnitudes lower than magnitudes of the noise are preserved in the processed signal after removal of the noise.

19. The one or more non-transitory computer-readable medium of claim 18, wherein the execution of the computer-readable instructions by the one or more processors, cause the one or more processors to process the signal by:
    performing a denoising process on the signal to remove the noise to yield a denoised signal; applying the machine learning model to determine a residual signal indicative of a difference between the signal and the denoised signal; and determining a processed signal by adding the residual signal to the denoised signal.

20. The one or more non-transitory computer-readable medium of claim 19, wherein the execution of the computer-readable instructions by the one or more processors, cause the one or more processors to control the plurality of sensors to determine the residual signal by determining a solution to a dual domain sparse inversion problem using a sparse representation of the residual signal and the noise.

21. The one or more non-transitory computer-readable medium of claim 20, wherein solving the dual domain sparse inversion problem includes using a deterministic algorithm, the deterministic algorithm corresponding to one of a non-monotone alternating direction method, or stochastic algorithm such as matching pursuit.

22. The one or more non-transitory computer-readable medium of claim 21, wherein the execution of the computer-readable instructions by the one or more processors, cause the one or more processors to form a dataset using the signal and perform the denoising process on the data set.

23. The one or more non-transitory computer-readable medium of claim 19, wherein the execution of the computer-readable instructions by the one or more processors, cause the one or more processors to:
    train the machine learning model with the denoised signal every time a different instance of the signal is received and a corresponding denoised signal is determined, by determining a solution to an optimization problem using a k-singular value decomposition algorithm.

24. The one or more non-transitory computer-readable medium of claim 18, wherein the data corresponds to seismic data collected by the plurality of sensors over a specified period of time.

\* \* \* \* \*